United States Patent [19]
Mantor et al.

[11] Patent Number: 6,044,457
[45] Date of Patent: Mar. 28, 2000

[54] STATE MACHINE CONTROLLER CAPABLE OF PRODUCING RESULT PER CLOCK CYCLE USING WAIT/NO WAIT AND EMPTY SIGNALS TO CONTROL THE ADVANCING OF DATA IN PIPELINE

[75] Inventors: Michael Mantor, Orlando; John Pedicone, Winter Springs; Steven Manno, Ormond Beach, all of Fla.; Val Gene Cook, Shingle Springs, Calif.

[73] Assignee: Real 3D, Inc., Orlando, Fla.

[21] Appl. No.: 09/054,820

[22] Filed: Apr. 3, 1998

[51] Int. Cl.[7] .................................................. G06F 13/00
[52] U.S. Cl. ............................................. 712/223; 712/1
[58] Field of Search .................................. 712/223, 201, 712/28, 30, 1

[56] References Cited

U.S. PATENT DOCUMENTS 5,477,445  12/1995  Weber ...................................... 712/200

*Primary Examiner*—Meng-Ai T. An
*Assistant Examiner*—Azad Karim
*Attorney, Agent, or Firm*—Scully, Scott, Murphy & Presser

[57] ABSTRACT

A state machine controller which can be used for fetching data for a real-time computer image generation system and which provides valid data for each clock interval of a system control clock. The state machine controller can produce a result per clock pulse, schedule new data to be processed before completion of the processing of previous data to prevent bubbles or interruptions in the data pipeline, and can stop and maintain its output if a hold is applied from a later pipeline stage, and can resume one clock operation on the clock pulse when the hold is removed.

8 Claims, 3 Drawing Sheets

Priority Encoder (Fetch Control)

I/O Request (Fetch Control)

STATE MACHINE CONTROLLER CAPABLE OF PRODUCING RESULT PER CLOCK CYCLE USING WAIT/NO WAIT AND EMPTY SIGNALS TO CONTROL THE ADVANCING OF DATA IN PIPELINE

BACKGROUND OF THE INVENTION

1. Field of the Invention

The present invention relates generally to a state machine controller, and more particularly pertains to a state machine controller which can be used for fetching data for a real-time computer image generation system and which provides valid data for each clock interval of a system control clock, thereby avoiding discontinues or bubbles in the data processing operations of the system.

2. Discussion of the Prior Art

The state machine controller of the present invention is particularly useful for implementation in an interpolator or a fetch machine in a computer, real-time image generating system as disclosed in Bunker, et al. U.S. Pat. No. 4,727,365.

U.S. Pat. No. 4,727,365 discloses a computer image generation system which is capable of generating complex objects in real-time for display on video displays. The computer video image generating system includes a computer memory having three dimensional object data stored therein. The system employs an advanced object generator for retrieving and processing the object data for output to a span processor for controlling the pixel-by-pixel video output signal for a video display. The advanced object generator includes a translucency processor, an edge-on fading processor, a level of detail blending processor and a bilinear interpolator for texture smoothing. The disclosed system utilizes interpolators and fetch machines which can be implemented by the state machine controller of the present invention.

SUMMARY OF THE INVENTION

Accordingly, it is an object of the present invention to provide a state machine controller as can be used to control linear interpolators and fetch machines.

A further object of the subject invention is the provision of a state machine controller which can produce a result per clock pulse, enter new data to be processed before completion of the processing of previous data to prevent bubbles or interruptions in the data pipeline, and can stop and maintain its output if a hold is applied from a later pipeline stage, and can resume one clock operation on the clock pulse when the hold is removed.

BRIEF DESCRIPTION OF THE DRAWINGS

The foregoing objects and advantages of the present invention for a state machine controller may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

The state machine controller of the present invention has the capability to move data each and every clock pulse. An exemplary application is a list of items to be processed in which one of the items to be processed is entered into a processor, and while the last details of the item are being processed, the next item on the list is entered into the processor.

Figure 1:
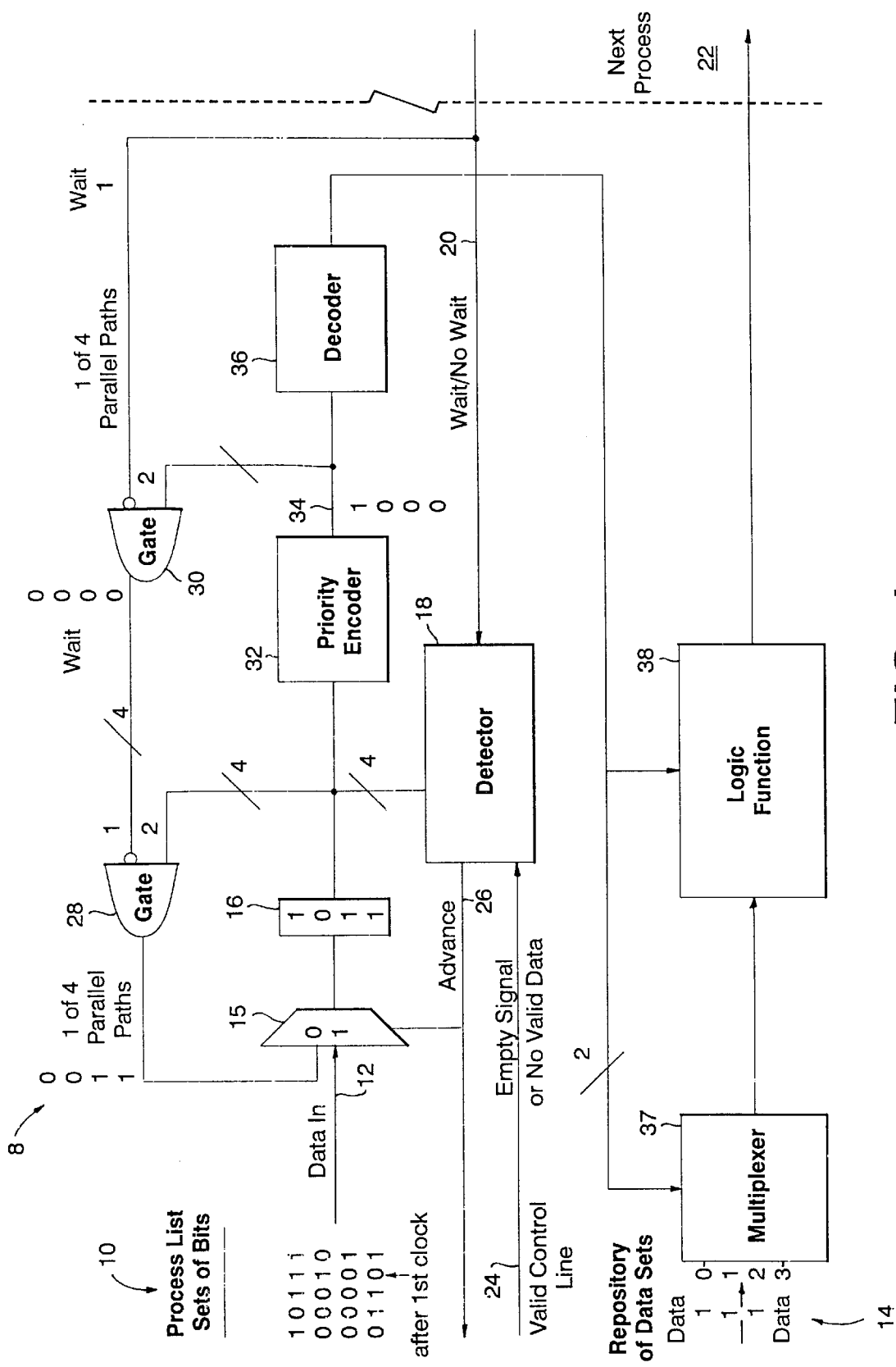
FIG. 1 illustrates a simplified schematic block diagram of a parallel to serial data converter as an exemplary embodiment of the present invention.

FIG. 1 illustrates a simplified schematic block diagram of a parallel to serial data converter 8 as an exemplary embodiment of the present invention.

A process list of bit sets 10 is at a Data In line 12. The overall objective of the circuit is the selection of one set of data out of a repository of N sets of data at 14. Each parallel set of bits at 10 indicates to the parallel to serial data converter circuit 8 which data sets at 14 to process.

For example, a first string of data bits 1011 at 10 is passed through a multiplexer 15 and is entered into a register 16, and indicates to the circuit to process data set zero (0), data set (2), and data set (3), but not data set (1). Accordingly, each bit at 10 represents whether or not to process a corresponding set of data.

At the start of operations, the register 16 is empty, and when the register 16 is empty it enters a set of bits from the process list 10.

On reset, the register 16 is all zeros, and a detector circuit 18 detects the all zeros condition.

The detector circuit 18 has two other inputs. A wait/no wait input line 20 indicates to the circuit 18 whether or not the data outputted by the parallel to serial data converter 8 can proceed to the next process 22. The next process 22 indicates asynchronously to the detector circuit 16 whether or not it is in a wait state via the wait/no wait line 20. An empty signal on a valid control line 24 indicates to the detector circuit 18 when the data sets of bits at 10 is empty.

The detector circuit 18 generates an advance output signal on advance line 26 in response to an empty signal condition. When the advance signal is high, the register 16 is loaded.

In summary, the detector circuit 18 detects if the register 16 is empty (all zeros) or only a single one is left and there is no wait condition present from the following process. If so and if valid data is present at 10, then the valid data (set of bits) is loaded into the register 16, and the data pipeline at 10 is advanced to the next parallel set of its (0001).

A control line from advance line 26 to MUX 15 selects Data In 12 when set to store data in register 16 on the following clock pulse.

If the next process 22 takes a data set at 14 on one clock pulse, and the processing of that set of data will not be completed prior to the next clock, then the next process 22 sets the wait/no wait line 20 high asynchronously before the next clock pulse. This causes the same set of bits to remain in the register 16 via two AND gates 28 and 30. After the first clock pulse, the bit set 1011 is loaded into the register 16. Once a bit set is loaded into the register 16, on the first clock pulse, a priority encoder 32 produces an output 1000 at 24 based upon the first register 16 contents of 1011.

The priority encoder 32 selects the highest priority "one" bit, in this case the first bit in the bit set to be processed. The priority of the inputs is arbitrary and can be user selected in any order. In the disclosed embodiment, priority is considered to be highest at the top of the bit set and lowest at the bottom, as indicated by the following TABLE 1.

TABLE 1

| Input to the priority decoder | Output |
|---|---|
| 1-highest priority | 1 |
| 0-next highest priority | 0 |
| 1-next highest priority | 0 |
| 1-lowest priority | 0 |

In the example, the priority encoder 32 produces a 1000 data string output at 34 which enters the decode unit 36. The decode unit 36 decodes the data string, and the decoded signal is used to control a multiplexer 37. In the example, if the first bit is a one, then the data set 0 at 14 is processed.

The wait/no wait line 20 is an input to the AND gate 30, the output of which is an input to a second AND gate 28.

The converter circuit 8 actually includes four identical sets of parallel AND gates 30, each of which is connected to the wait/no wait line 20. Moreover, each of the four AND gates 30 forms an input to each of four AND gates 28, processing data as indicated in FIG. 1.

Circuit 18 detects when there are only one or no bits left to be processed in the set of bits currently stored in register 16. Circuit 18 also detects whether the currently stored set of bits is all zeros, and then enters a new set of bits therein. Circuit 18 also determines when there is only one set bit left in the current set of bits, and when the wait line 20 is low, then enters a new set of bits into the register 16.

The AND gates 30 and 28 have the following conditions:
CONDITION 1-HOLDING—If the wait/no wait line 20=1, then the controller is in a hold or wait state, which causes the inverter at the upper input to AND gate 30 to produce a 0 input into the AND gate 30, which causes the AND gate 24 to produce a zero at its output. The effect of hold or wait state is to not let the data pattern at the lower input to AND gate 80 to pass through thereby preventing the continued processing of the process list. The inverter at the upper input to AND gate 28 then produces a series of all 1's into the AND gate 28, which essentially keeps the register 16 contents intact.
CONDITION 2-NOT HOLDING—When there is no wait, then the wait/no wait line 20=0. On the clock pulse when the wait line 20 goes low, then the inverter at the upper input to AND gate 30 forms a high input for the AND gate 30, such that the AND gate 30 passes the input signal at its second input. The Priority Encoder 30 data (1000) is thus fed through AND gate 30 and becomes inverted (0111) on the input side of AND gate 28, and is then ANDed with the output of register 16.

In the example, when the wait/no wait line goes low, the output of the priority encoder 32 passes through AND gate 30 and is inverted at the input to AND gate 28, and is then ANDed with the register 16 output to yield.

The last column 0 0 1 1 passes through multiplexer 15 and becomes the new input to the register 16. The cycle repeats, and the output of the priority decoder 18 now becomes 0 0 1 0 and register 16 input becomes 0001 providing no waits are present.

The logic function block 38 merely represents the fact that the data is usually being modified in some form before it is directed to the next process 22. Alternatively, the data might not be modified at all and is just passed through.

EXAMPLE #1

Fetch Machine Control

The fetch machine has the control logic for making read requests. It consists of a bank of pipeline registers, a four-bit priority encoder, 1/0 request detect, FIFO read logic, address valid/span mark generation. Instead of using state machines to issue the requests, the requests are flow-controlled through pipeline registers and the priority encoder.

Expressing the sequential process of the fetch requests would result in a five-state FSM (Finite State Machine), with state transitions from every state to every other state. One state would be used for the idle case, and the four additional states for the four types of DQW requests (W, X, Y and Z).

Figure 2:
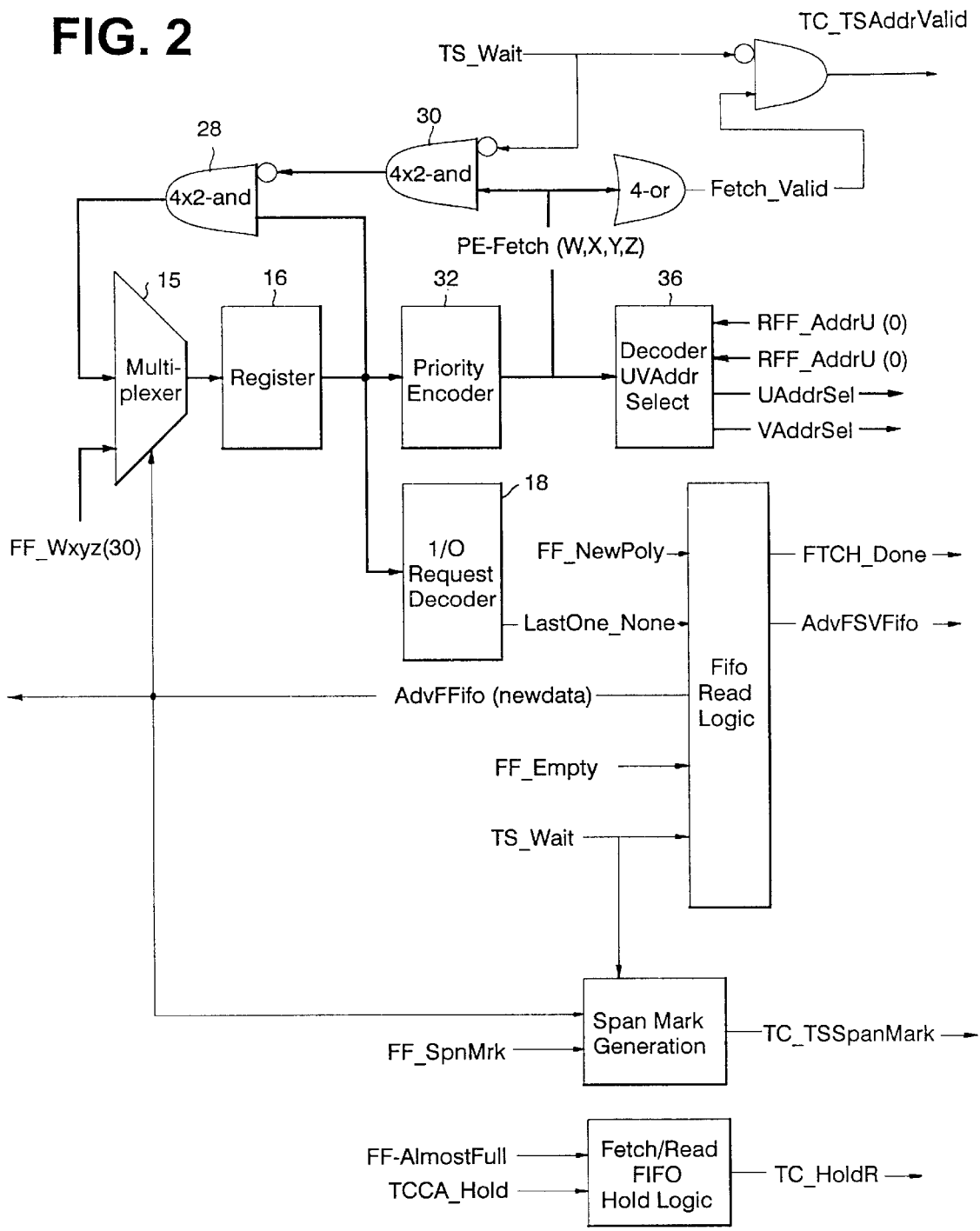
FIG. 2 illustrates a more complete schematic block diagram of the parallel to serial data converter of FIG. 1 in an exemplary embodiment of a fetch control in a computer real-time image generating system.

FIG. 2 is a more complete block diagram of the parallel to serial data converter of FIG. 1 in an exemplary embodiment of fetch control in a computer real-time image generating system, wherein elements in common with FIG. 1 have common reference numerals. The FIFO outputs are first registered into a bank of rising edge flip-flops, and the read enable is asserted to the fetch FIFO to output the next entry. The priority encoder then extracts the highest priority request and presents it to the stream controller by asserting address valid; the selected request is passed to the Fetch Address Data-path to select the final address muxes; the priority encoder continues to extract the next request per clock until there are none left.

When the last request or no request is being processed, the 1/0 request decoder will enable the FIFO read logic which will generate the read enables to advance the FIFO's. When the stream controller asserts wait, the output of the priority encoder is killed and the data in the pipeline registers is recirculated until the wait is removed.

Figure 3:
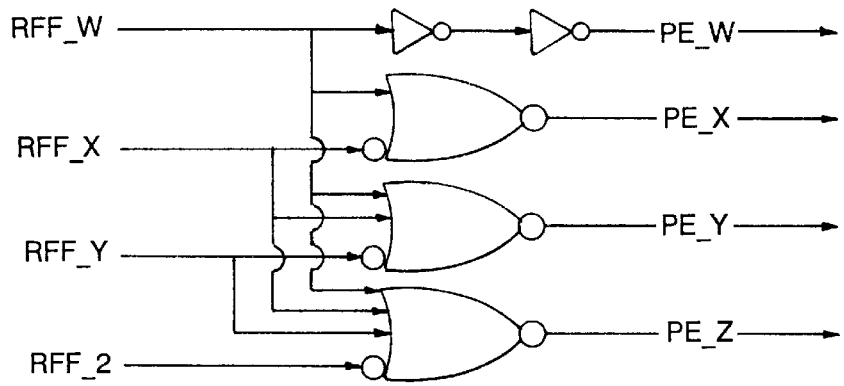
FIG. 3 illustrates details of a 4-bit priority encoder as used in fetch control.

FIG. 3 illustrates details of a 4-bit Priority Encoder (PE) as used in fetch control; note that W has the highest priority, followed by X, Y and then Z. For example, when WXYZ= 1XXX where X is a "don't care", the output of the priority encoder has the W-bit set, others reset; when WXYZ=0011, the priority encoder output has the Y-bit set and other bits reset. Note that only one bit of the priority encoder output will be set for any input, and for an input of all zeros the priority encoder output will be all zeros.

The function of the 1/0 Request Decoder is to alert the read FIFO logic when there is one or no fetches left. When there is one fetch left and no holds present or no fetches left,

| register 16 output | priority encoder 32 output | top input to AND 28 | AND gate 28 output |
|---|---|---|---|
| 1 | 1 | 0 | 0 |
| 0 | 0 | 1 | 0 |
| 1 | 0 | 1 | 1 |
| 1 | 0 | 1 | 1 | the sequencer moves the current fetch FIFO output into its register and reads the next entry in the fetch FIFO. This is done to maximize the fetch request rate and to enable the stream interface to lookup the data needed by the texture cache as soon as possible. Also, it prevents injecting bubbles in the fetch request stream when the FIFO is not empty. When there is zero left, that means the sequencer is ready to make the next request but is prevented by stream interface wait or empty fetch FIFO, like after reset. As soon as the TSI wait is removed, and an entry is written into the fetch FIFO, the zero left condition enables the sequencer to immediately start operation.

The fetch control logic is designed with a fetch FIFO with the following characteristics: 1) FIFO responds to a read in one clock; 2) it is able to pipeline the reads; 3) the FIFO output data is valid whenever the empty signal is de-asserted; and 4) the almost full signal is asserted when N-1 entries have been loaded into the N-entry FIFO. In the clock, the fetch FIFO de-asserts its empty signal, the fetch sequencer asserts its read enable so the new fetch FIFO output becomes available in the next clock pulse while it processes the current FIFO entry.

Figure 4:
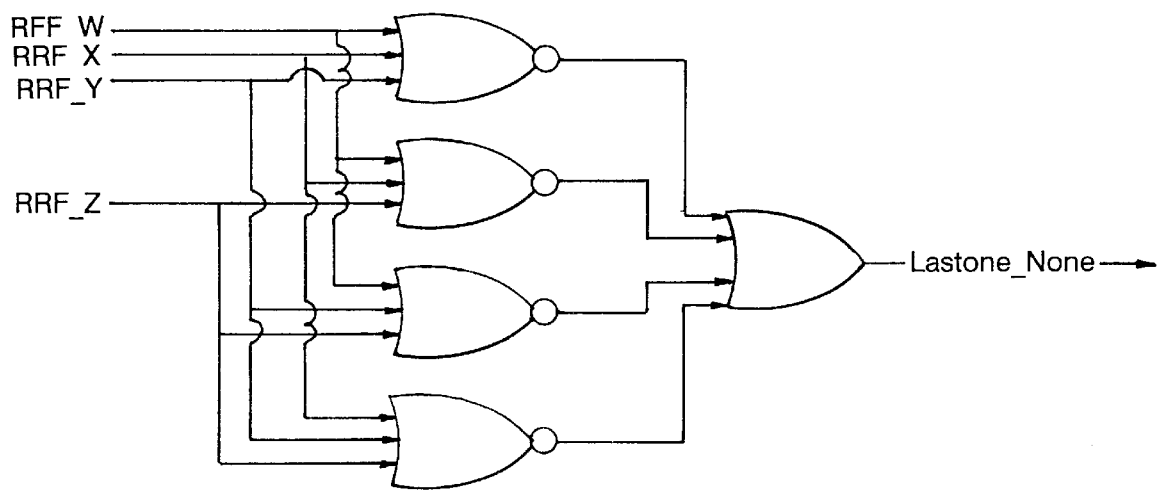
FIG. 4 is a block diagram of an I/O request as used in fetch control.

FIG. 4 is a block diagram of an 1/0 request as used in fetch control. The function of the 1/0 Request Decoder is to alert to the read FIFO logic when either no fetches are left or only one fetch is left without a wait condition. When the 1/0 indicates that new data needs to be loaded, the sequencer moves the FIFO output into its register and advances to the next entry in the fetch FIFO.

EXAMPLE #2

Linear Interpolator Control

Interpolator controller

The Interpolator unit is controlled by a priority encoder style state machine. This machine registers a copy of the pixel mask for the current span and uses a priority encoder to identify the most significant 1 in the mask. The output of the encoder is a 16 bit vector which contains a one in the position corresponding to the most significant 1 of the pixel mask. The addresses and delta values are then generated for this pixel. The output of the priority encoder is inverted and ANDed with the current contents of the pixel mask register in order to replace the most significant 1 with 0. This result is then stored back in the register. This process continues until every 1 in the pixel mask is replaced by a 0. When there is one or no entries left, a new value is loaded in, if available to allow continued operation without missing a clock. The circuit will also asynchronously accept a wait from down stream and only be held for any clock that the wait is present.

The following TABLE 2 identifies the output values of the pixel mask register and the priority encoder for the example.

TABLE 2

| Current Pixel Mask | Priority Encoder | Encoder Bar | Next Pixel Mask |
| --- | --- | --- | --- |
| 0x8CEC | 0x8000 | 0x7FFF | 0x0CEC |
| 0x0CEC | 0x0800 | 0xF7FF | 0x04EC |
| 0x04EC | 0x0400 | 0xFBFF | 0x00EC |
| 0x00EC | 0x0080 | 0xFF7F | 0x006C |
| 0x006C | 0x0040 | 0xFFBF | 0x002C |
| 0x002C | 0x0020 | 0xFFDF | 0x000C |
| 0x000C | 0x0008 | 0xFFF7 | 0x0004 |
| 0x0004 | 0x0004 | 0xFFFB | 0x0000 |

While several embodiments and variations of the present invention for a state machine controller are described in detail herein, it should apparent that the disclosure and teachings of the present invention will suggest many alternative designs to those skilled in the art.

What is claimed is:

1. A method of operating a state machine controller which can produce a result per clock pulse, schedule new data for processing before completion of processing of previous data to provide a continuous and uninterrupted flow of data in a data pipeline, and can stop and maintain its output if a hold is applied from a later pipeline stage, comprising:

a. providing a repository of data sets;

b. providing a process list of parallel sets of bits in a data pipeline, wherein each parallel set of bits indicates which data sets to process, and each bit represents whether or not to process a particular data set;

c. loading a set of bits into a register and advancing the data pipeline to the next parallel set of bits;

d. providing a wait/no wait input signal which indicates whether or not the data outputted by the state machine controller can proceed to the next process and an empty signal which indicates when there are no more data sets to be processed; and e. detecting when there are only one or no bits left to be processed in the set of bits currently stored in the register, and when the wait/no wait signal indicates wait, causing the same set of bits to remain in the register, and when the wait/no wait signal indicates no wait and the empty signal indicates there are more data sets to process, then entering another parallel set of bits from the process list and advancing the data pipeline to the next parallel set of bits.

2. A method of operating a state machine controller as claimed in claim 1, wherein a priority encoder produces an output based upon the contents of the register, and the priority encoder selects the highest priority bit in the bit set to be processed.

3. A method of operating a state machine controller as claimed in claim 2, wherein a decoder decodes the output of the priority encoder, and based thereon selects one or more data sets to be processed.

4. A method of operating a state machine controller as claimed in claim 2, wherein a first AND gate receives the wait/no wait signal as a first input and the output signal of the priority encoder as a second input, and depending upon the state of the wait/no wait signal, either passes or blocks the output signal of the priority encoder.

5. A method of operating a state machine controller as claimed in claim 4, wherein a second AND gate receives the output of the first AND gate, the second AND gate forms an input to the register, and when the wait/no wait signal indicates no wait, the first AND gate passes the output signal of the priority encoder as an input to the second AND gate, which ANDs the output signal of the priority encoder with the output of the register, to form a new input set of data into the register.

6. A method of operating a state machine controller as claimed in claim 5, including a plurality of parallel connected first AND gates, each of which is connected to the wait/no wait signal, and the first AND gates form an input to a plurality of second AND gates, for parallel processing of data.

7. A method of operating a state machine controller as claimed in claim 1, for controlling a fetch machine which has control logic for making read requests, and comprises a bank of pipeline registers, the priority encoder, 1/0 request detect, FIFO read logic, and address valid/span mark generation, and wherein read requests are flow-controlled through the pipeline registers and the priority encoder.

8. A method of operating a state machine controller as claimed in claim 3, for controlling an interpolator which registers a copy of a pixel mask, and uses the priority encoder to identify the most significant pixel in the mask, wherein the output of the encoder is a multiple bit vector which contains a one pixel in the position corresponding to the most significant one pixel of the pixel mask, addresses and delta values are then generated for this pixel, the output of the priority encoder is ANDed with the current contents of the pixel mask register to replace the most significant one with a zero, the result is then stored back in the register, and the process is continued until every one in the pixel mask is replaced by a zero.

* * * * *